Oct. 2, 1928.

E. P. DAVIS ET AL 1,686,227

MEANS FOR THE PASTEURIZATION OF MILK

Filed Feb. 21, 1927

Inventors
E. P. Davis.
J. C. Ross.
M. E. Smith.

By Lacey & Lacey, Attorneys

Patented Oct. 2, 1928.

1,686,227

UNITED STATES PATENT OFFICE.

ERBY P. DAVIS, JAMES C. ROSS, AND MARTIN E. SMITH, OF NEW CASTLE HUNDRED, DELAWARE.

MEANS FOR THE PASTEURIZATION OF MILK.

Application filed February 21, 1927. Serial No. 169,918.

This invention provides for the treatment of lacteal and other fluids, whereby to destroy fermenting and noxious germs, to prevent rapid deterioration and to make the same suitable for feed.

The invention supplies an apparatus which may be readily assembled and separated and which is simple and adapted to be easily and effectively operated, both for heating the milk to kill any ferment and immediately cooling the milk to prolong its period of sweetness, both operations being effected in a single closed cycle.

The invention contemplates apparatus embodying inner and outer receptacles having an enclosed separating space to receive water to be heated and utilized for raising the temperature of the contents of the inner receptacle to a degree to effect pasteurization thereof, means being provided to circulate the hot water through and about the inner receptacle, whereby to effect a rapid and thorough heating of the contents of the inner receptacle without overheating, thereby preserving the natural flavor and qualities of milk.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Corresponding and like parts are referred to in the following description and designated in both views of the drawings by like reference characters.

Figures 1, 2:
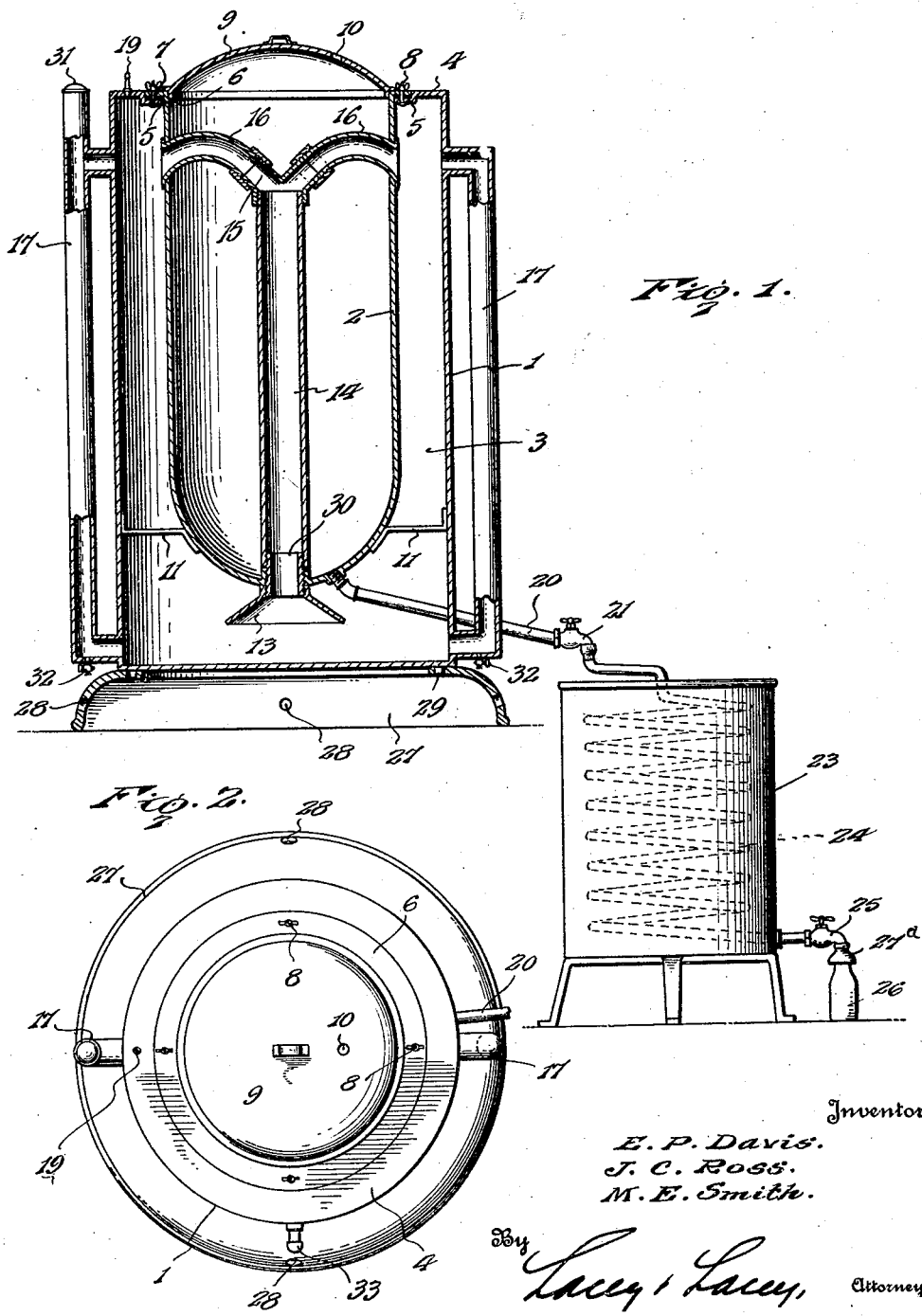
Figure 1 is an elevational view, partly in section, of a pasteurizing apparatus embodying the invention.
Figure 2 is a top plan view of the pasteurizer.

The pasteurizer embodies an outer receptacle 1 and an inner receptacle 2, the latter being of smaller proportions and centrally disposed to provide a space 3 between the two receptacles. A flange 4 projects inwardly from the top of the receptacle 1 and its inner marginal portion is depressed, as indicated at 5, to provide a seat for the outwardly disposed flange 6 at the top of the inner receptacle 2. A gasket 7 is interposed between the seat 5 and flange 6 to insure the formation of a close joint. Suitable locking devices 8 are provided to draw the parts 5 and 6 together to clamp the washer 7 therebetween. The space 3 is closed at its upper end by the inwardly disposed flange 4. A cover 9 closes the inner receptacle 2 and is provided with a centrally disposed handle and an opening 10, the latter providing for the insertion of a thermometer to determine the temperature. Brackets 11 projecting inwardly from the outer receptacle 1 assist materially in supporting and centralizing the inner receptacle 2.

The outer receptacle 1 is mounted on a circular base 27, preferably of cast iron, the walls of which contain four spaced holes 28 for the admission of air into the combustion chamber which is formed by the bottom of the outer receptacle. The walls of the base incline inwardly at the top and engage the peripheral portion of the outer receptacle 1 to which it is bolted and otherwise attached by means of four lugs 29 spaced and projecting below the receptacle. The bottom of the outer receptacle is preferably flat, whereas the bottom of the inner receptacle 2 is preferably round and formed centrally with an opening in which is fitted a short pipe 30 threaded at both ends and projecting both inside and outside of such receptacle. The threaded nozzle of a funnel 13 may optionally be fitted to the outside or lower end of the pipe 30. A vertically disposed pipe 14 is located centrally within the receptacle 2 and is coupled at its lower end to the upwardly projecting end of the pipe 30. Oppositely disposed branches 15 are provided at the upper end of the pipe 14 and short pipes 16 are connected thereto and open through the sides of the receptacle 2 adjacent to the top thereof. The branch pipes 15 incline upwardly and outwardly and the pipes 16 curve outwardly and then downwardly to discharge the cooling water into the upper portion of the space 3 where it mingles with the upper water thereof.

Return pipes 17 are disposed at opposite sides of the outer receptacle 1. The lower ends of the pipes 17 connect with the lower portion of the space 3 and the upper ends connect with the upper portion of the space 3 at points opposite the branch pipes 16. One of the return pipes 16 extends upwardly above its connection with the upper portion of the receptacle 1 and is fitted with a cap 31, such extension being for the purpose of filling the space 3 with water. A drain cock 32 is fitted to the lower end of the return pipes 16 and provides for drawing off the water. A pipe 20 projects laterally from the bottom of the receptacle 2 and inclines outwardly and downwardly and passes through the wall of the receptacle 1 and has a faucet 21 applied thereto for controlling the discharge of the contents of the receptacle 2. A cooler 23 is associated with the pasteurizer as an adjunct thereof to receive the milk or other fluid and cool the same. The cooler 23 includes a vessel to receive the refrigerating medium and a coil 24. The faucet 21 has a tight connection with the upper end of the coil 24 and the lower discharge end of the coil is provided with a faucet 25 which is adapted to make a close connection with the container 26 or other part to receive the fluid and thereby exclude the air. A suitable closure 27ᵃ such as a rubber cap, is applied to the nozzle of the faucet 25 to insure an air tight connection thereof with the part designed to receive the cooled pasteurized fluid. A valve 19 applied to the part 4 closing the top of the space 3 is of the type to relieve dangerous pressure caused by steam accumulating in the top portion of the space 3.

In the operation of the apparatus, the milk to be pasteurized is supplied to the inner receptacle 2, and the space 3 between the two receptacles, together with the respective pipes and tubes is filled with water. The apparatus is placed upon a stove, or heat applied to the bottom of the outer receptacle 1, in any preferred way and the water becoming heated at the bottom passes upwardly through the space 3 between the two receptacles and in the same way through the pipe 14 which discharges the denser and cooler water into the space 3 where it mingles with the cooler water in the space 3 and is forced into return pipes 17 where it passes to the bottoms of the return pipes and enters into the space 3 at the bottom part thereof through the opening therein provided for reheating, thus providing, after the elimination of the air cushion which may form in the unoccupied space at the top of the space 3, by means of the relief valve 19 disposed at the highest point in the covering of the space 3, thus providing for a continuous circulation of hot water of even temperature around the sides and through the center of the receptacle 2 which contains the milk or other fluid to be pasteurized. After the process has been completed, the heated fluid is drawn off through the pipe 20 into the cooler 23, thence into the vessel 26 without coming in contact with the outside air and in condition for use. The numeral 33 designates a gauge disposed on the front part of the apparatus and near the top thereof for the purpose of indicating the level of the water in the space 3 and the respective tubes and pipes.

Having thus described the invention, we claim:

1. A pasteurizing appliance comprising an outer receptacle having an inwardly disposed flange at its upper end, an inner receptacle spaced from the outer receptacle and having an outer flange at its upper end engaging the inner flange of the outer receptacle, the combined flanges closing the space formed between the two receptacles, a pipe within the inner receptacle and opening through the bottom thereof and branched at its upper end, said branches inclining upwardly and outwardly and opening through the sides of the inner receptacle, and a return pipe exterior to the outer receptacle and forming connecting means between the upper and lower portions of the space provided between the two receptacles, said appliance being provided with an air escape valve in the top covering the space.

2. A hot water pasteurizing appliance comprising spaced inner and outer receptacles having the intervening space closed at its upper end, the inner receptacle having an opening in its bottom and a short pipe threaded at both ends fitted into the opening formed in the bottom of the inner receptacle and projecting a short distance downwardly, to which may be attached the nozzle of an inversely disposed funnel, and also projecting for a short distance upwardly, to which a pipe may be coupled extending upwardly with branches leading from the upper end of the pipe through the sides of the inner receptacle and return pipes on opposite sides of the outer receptacle and in communication with the upper and lower portions of the space formed between the two receptacles.

3. A pasteurizing appliance comprising spaced inner and outer receptacles, means connecting the upper ends of the receptacles and closing the space formed therebetween, a cover closing the inner receptacle, a pipe disposed centrally within the inner receptacle and opening through the bottom thereof into the space formed between the two receptacles, upwardly and laterally deflected branch pipes connecting the upper end of the centrally disposed pipe with the sides of the inner receptacle and communicating with the space between the receptacles, and return pipes exterior to the outer receptacle and in communication with the upper and lower portions of the space formed between the two receptacles.

In testimony whereof we affix our signatures.

ERBY P. DAVIS. [L. S.]
JAMES C. ROSS. [L. S.]
MARTIN E. SMITH. [L. S.]